US009499192B2

(12) United States Patent
Minami

(10) Patent No.: US 9,499,192 B2
(45) Date of Patent: Nov. 22, 2016

(54) STEERING DEVICE

(71) Applicant: FUJI JUKOGYO KABUSHIKI KAISHA, Tokyo (JP)

(72) Inventor: Mitsuharu Minami, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/638,993

(22) Filed: Mar. 4, 2015

(65) Prior Publication Data

US 2015/0251687 A1   Sep. 10, 2015

(30) Foreign Application Priority Data

Mar. 6, 2014   (JP) ................................. 2014-044281

(51) Int. Cl.
*B62D 3/12* (2006.01)
*F16H 57/021* (2012.01)

(52) U.S. Cl.
CPC ................ *B62D 3/126* (2013.01); *B62D 3/12* (2013.01); *F16H 57/021* (2013.01); *Y10T 74/1967* (2015.01)

(58) Field of Classification Search
CPC ....... B62D 3/12; B62D 3/126; F16H 57/021; F16H 2057/0216
See application file for complete search history.

(56) References Cited

U.S. PATENT DOCUMENTS

| 6,041,885 A * | 3/2000 | Watanabe | B62D 3/12 |
| | | | 180/444 |
| 6,418,808 B1 * | 7/2002 | Kishizawa | B62D 3/12 |
| | | | 74/388 PS |
| 2002/0085778 A1 * | 7/2002 | Mena | B62D 3/12 |
| | | | 384/276 |
| 2005/0104463 A1 * | 5/2005 | Oh | F16C 17/08 |
| | | | 310/90 |
| 2010/0278467 A1 * | 11/2010 | Hirose | B62D 3/12 |
| | | | 384/283 |
| 2011/0175311 A1 | 7/2011 | Tanaka et al. | |
| 2014/0216183 A1 * | 8/2014 | Nakayama | B62D 5/0442 |
| | | | 74/29 |
| 2015/0151787 A1 * | 6/2015 | Ohashi | B62D 7/163 |
| | | | 280/93.511 |
| 2015/0274195 A1 * | 10/2015 | Tokura | B62D 3/126 |
| | | | 180/443 |

FOREIGN PATENT DOCUMENTS

| CN | 102135164 A | 7/2011 |
| JP | 2007-131025 A | 5/2007 |
| JP | 2013-6470 A | 1/2013 |

OTHER PUBLICATIONS

Office Action Chinese Patent Application No. 201510094742.X dated Jul. 19, 2016.

* cited by examiner

*Primary Examiner* — Barry Gooden, Jr.
(74) *Attorney, Agent, or Firm* — McDermott Will & Emery LLP

(57) ABSTRACT

A steering device includes: a pinion shaft that has a pinion on an outer circumferential surface thereof; a rack shaft that has a rack that engages with the pinion; a rack housing that has a recess on an inner circumferential surface thereof and accommodates the rack shaft; a rack guide that has a protrusion smaller than a width of the recess in axial directions of the rack shaft, and is disposed inside the recess, the rack guide contacting an outer circumferential surface of the rack shaft and an inner circumferential surface of the rack housing, and guiding the rack shaft along an axis of the rack shaft; and a spacer that contacts one side and the other side of the protrusion in the axial directions of the rack shaft, and is disposed between an inner surface of the recess and an outer surface of the protrusion.

9 Claims, 4 Drawing Sheets

… (1)

STEERING DEVICE

CROSS-REFERENCE TO RELATED APPLICATION

The present application claims priority from Japanese Patent Application No. 2014-044281 filed on Mar. 6, 2014, the entire contents of which are hereby incorporated by reference.

BACKGROUND

1. Technical Field

The present disclosure relates to a steering device.

2. Related Art

Conventionally, a rack shaft is slidably supported by a rack bush mounted to a housing, and the rack bush is fixed by engaging an engagement projection of the rack bush into which the rack shaft is inserted with an engagement groove of the housing (see, for example, as an invention disclosed in Japanese Unexamined Patent Application Publication (JP-A) No. 2007-131025).

However, a gap is always formed between the engagement projection and the engagement groove. This is required for assembling constituent members, and the gap size varies to some extent within a range of designed tolerance depending on steering devices. Since the rack bush engages through the gap so that it has backlash, the rack bush may remain influenced by a previous steering operation when steering operations are successively performed. Therefore, a difference may be caused in steering feel between a case where the steering operation goes on in the same direction and a case where the steering operation turns into the opposite direction.

SUMMARY OF THE INVENTION

A purpose of the present disclosure is to provide a steering device that does not cause or is difficult to cause a difference in steering feel between turning and turning back of a steering wheel.

An aspect of the present disclosure provides a steering device that includes: a pinion shaft that has a pinion on an outer circumferential surface thereof; a rack shaft that has a rack that engages with the pinion; a rack housing that has a recess on an inner circumferential surface thereof and accommodates the rack shaft; a rack guide that has a protrusion formed smaller than a width of the recess in axial directions of the rack shaft, and is disposed inside the recess; the rack guide that contacts an outer circumferential surface of the rack shaft and an inner circumferential surface of the rack housing, and guides the rack shaft along an axis of the rack shaft; and a spacer that contacts one side and the other side of the protrusion in the axial directions of the rack shaft, and is disposed between an inner surface of the recess and an outer surface of the protrusion.

The spacer may be an elastic member having elasticity.

The recess may be formed on the entire inner circumferential surface of the rack housing. The spacer may include two annular members. The annular members may be respectively disposed at one side and the other side of the protrusion in the axial directions of the rack shaft.

The recess may be formed so that a width thereof in the axial directions of the rack shaft is smaller toward outside in radial directions of the rack shaft.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

A steering device according to the present disclosure is applicable to any vehicles that require a steering operation, and are provided with a steering mechanism having a pinion and a rack. Hereinafter, one example of the steering device according to the present disclosure is described with reference to the accompanying drawings.

Figure 1:
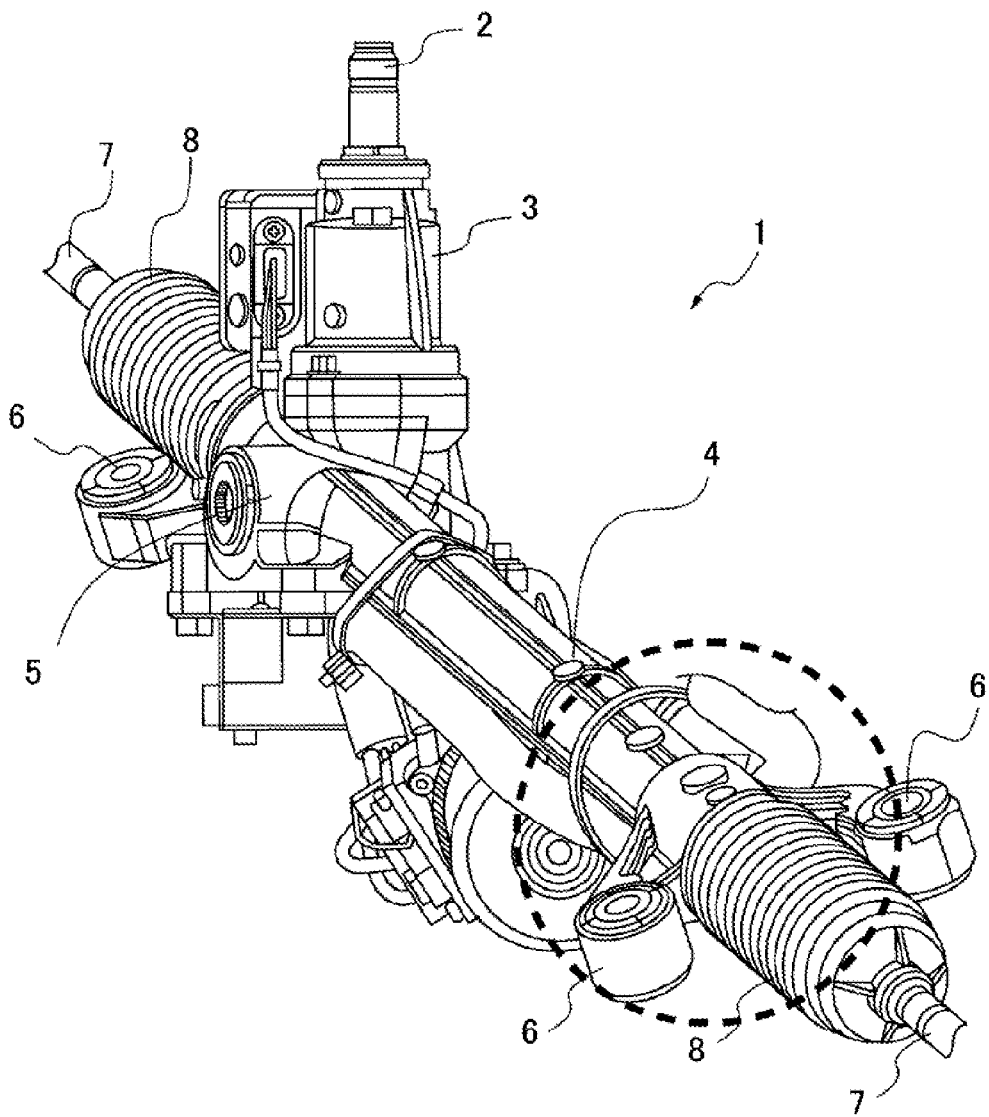
FIG. 1 is a perspective view illustrating one example of a steering device according to the present disclosure.

FIG. 1 is a perspective view partially illustrating a steering device 1 that is one example of the steering device according to the present disclosure.

As illustrated in FIG. 1, the steering device 1 includes a pinion shaft 2, a pinion housing 3, a rack housing 4, a retainer housing 5, fixed parts 6, tie rods 7, and boots 8.

The pinion shaft 2 is a shaft body having a substantially circular pillar shape. The pinion shaft 2 is connected at one end with a steering wheel, a steering column, and a suitable coupling member (none of them is illustrated), and a pinion (not illustrated) is formed around an outer circumferential surface of the other end. The pinion shaft 2 is a member rotatable about the center axis thereof when a steering operation is performed by rotating or turning the steering wheel.

The pinion housing 3 is a cylindrical casing that partially accommodates the other end part of the pinion shaft 2 where the pinion is formed. The rack housing 4 is a cylindrical casing that extends in width directions of a vehicle body where the steering device 1 is disposed, and through which a rack shaft (not illustrated in FIG. 1) is inserted. The retainer housing 5 is a cylindrical casing that accommodates a rack retainer (not illustrated). A biasing member is provided inside the retainer housing 5 to bias the rack retainer so that the rack retainer contacts the rack shaft, while pressing the rack against the pinion. Therefore, the rack and the pinion can maintain their engaging state. The pinion housing 3, the rack housing 4, and the retainer housing 5 cross at one location, and are formed integrally.

Each fixed part 6 is a member for fixedly mounting the steering device 1 to part of a constituent member of the vehicle body (for example, a cross member) by a suitable fastener, and a plurality of the fixed parts 6 is provided to the rack housing 4.

Each tie rod 7 is a shaft body coupled to each of both ends of the rack shaft that is inserted in the rack housing 4. The axes of the tie rods 7 and the axis of the rack shaft are substantially aligned with each other. Similar to the extending directions of the rack housing 4, the tie rods 7 extend in the width directions of the vehicle body, and are connected to left and right front wheels via suitable coupling members. When a steering operation is performed, the tie rods 7 move together with the rack shaft in one of the width directions of the vehicle body along their axes to steer the left and right front wheels and, thus, the traveling direction of the vehicle can be changed as a result. The boots 8 are members wrapping around coupling parts between the tie rods 7 and the rack shaft.

Figure 2A:
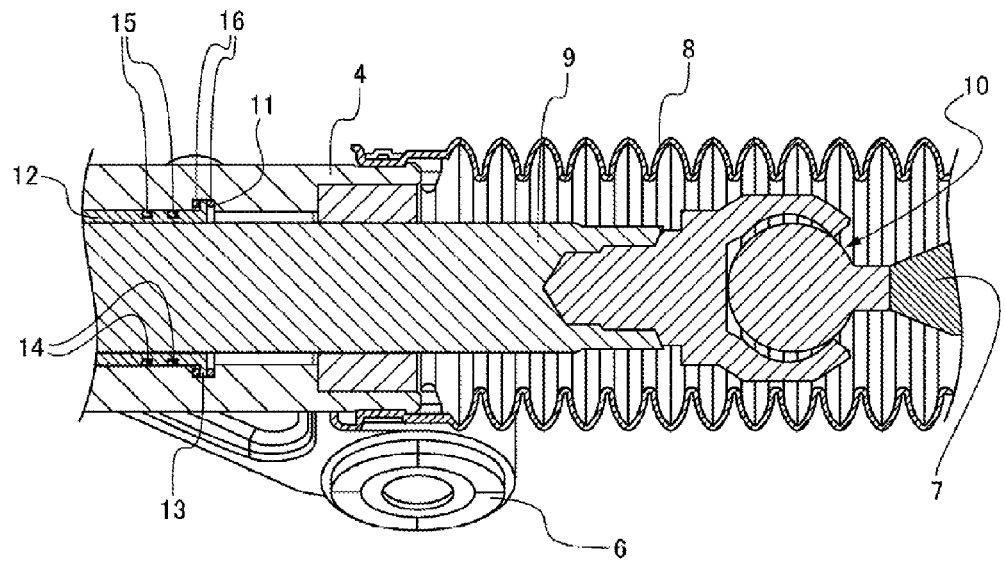
FIGS. 2A and 2B are partially enlarged cross-sectional views of the steering device illustrated in FIG. 1.
Figure 2B:
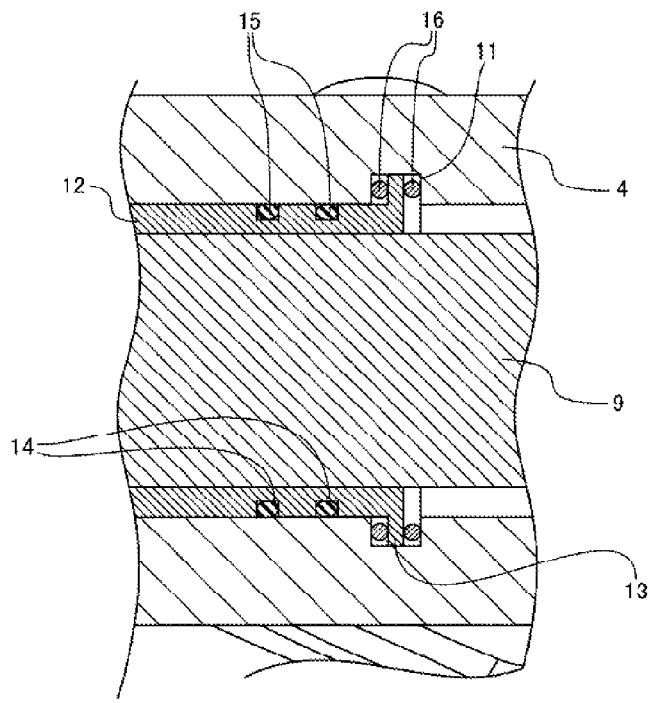

Next, FIG. 2A illustrates a schematic cross-sectional view of part enclosed by a dashed line in FIG. 1 (i.e., one end part of the rack housing 4). FIG. 2B is a schematic cross-sectional view where vicinity of a rack guide illustrated in FIG. 2A is further enlarged. Note that the cross-sectional views illustrating in FIGS. 2A and 2B are created by cutting the steering device 1 in parallel to the axes of the rack housing 4 and the rack shaft (described later).

As illustrated in FIGS. 2A and 2B, a rack shaft 9 is disposed inside the rack housing 4 so as to align a center axis of the rack shaft 9 with the axis of the rack housing 4. The rack shaft 9 is disposed so that an end thereof projects from one end opening of the rack housing 4. A ball joint 10 is interposed in the coupling part in each end of the rack shaft 9 with each tie rod 7. A substantially spherical member that is part of the ball joint 10 is provided to one end part of the tie rod 7, and the tie rod 7 is fitted into a fitting part formed so as to cover the substantially spherical member. Thus, the tie rod 7 can also move in directions other than the width directions of the vehicle body.

The rack shaft 9 is a bar member having a substantially circular cross section, and the rack (not illustrated) that engages with the pinion of the pinion shaft 2 is formed lineally on part of the outer circumferential surface of the rack shaft 9. As the pinion shaft 2 rotates according to a steering operation, the rack shaft 9 can move along the axis thereof by the engagement of the pinion and the rack. That is, the rack shaft 9 is movable in the lateral directions of FIG. 2A.

A recess 11 is circumferentially formed on an inner circumferential surface of the rack housing 4. A rack guide 12 is disposed inside the rack housing 4, near the one end opening of the rack housing 4. Although the recess 11 is formed the entire inner circumferential surface of the rack housing 4, recess(es) may be formed only at specific location(s) instead of the entire circumferential surface in the present disclosure by suitably changing the shape of a protrusion of the rack guide (described later), the shape of a spacer, etc.

In particular, as illustrated in FIG. 2B, the rack guide 12 is a cylindrical member provided between the outer circumferential surface of the rack shaft 9 and the inner circumferential surface of the rack housing 4, and has a flange-shaped protrusion 13 that projects radially outward from an end edge part of the rack housing 4 on the opening side. The protrusion 13 is part that engages with the recess 11 of the rack housing 4, and has a width smaller than the width of the recess 11 in the axial directions of the rack shaft 9, i.e., the width of the recess 11 in the lateral directions of FIGS. 2A and 2B.

Two slots 14 are circumferentially formed on the outer circumferential surface of the cylindrical part of the rack guide 12. Note that the number of slots formed on the outer circumferential surface of the cylindrical part of the rack guide 12 is not limited in particular and may be one or three or more, as long as stabilization of the behavior of the rack shaft 9 can be secured. An O-ring 15 is fitted into each slot 14. An inner side of the O-ring 15 contacts the slot 14 in radial directions of the rack guide 12, and an outer side thereof contacts the inner circumferential surface of the rack housing 4. Thus, the axis of the rack guide 12 can be aligned with the axes of the rack housing 4 and the rack shaft 9 as much as possible, regardless of the existence of a steering operation. Therefore, the rack guide 12 is limited in the position inside the rack housing 4, by the engagement of the protrusion 13 with the recess 11 and the placement of the O-rings 15. Further, the rack guide 12 guides the rack shaft 9 that moves in the axial directions, by contacting with the outer circumferential surface of the rack shaft 9. Note that the rack guide 12 can move inside the rack housing 4 to some extent in the axial directions of the rack shaft 9. The motion of the rack guide 12 will be described later.

Elastic members 16 are provided so as to contact one side surface and the other side surface of the protrusion 13 in the axial directions of the rack shaft 9. The elastic member 16 is disposed between the inner surface of the recess 11 and the outer surface of the protrusion 13. The elastic members 16 illustrated in FIGS. 2A and 2B are made of suitable elastomer, etc. and formed as annular members having a substantially circular cross section. The elastic members 16 are made of the same material and have the same cross section diameter. The elastic forces of the two elastic members 16 can be uniform by adopting the same material and the same cross section diameter for the elastic members 16. Thus, the position of the protrusion 13 within the recess 11 of the rack housing 4 can be substantially fixed. The elastic member 16 is one example of a spacer of the steering device according to the present disclosure. Note that the spacer may be a hard member made of hard material in the present disclosure. If the spacer of hard member is disposed so as to fill the gap between the recess 11 and the protrusion 13, the difference in steering feel will not be caused or will be difficult to be caused between a turning and a turning back of the steering wheel, as will be described later.

When engaging the protrusion 13 with the recess 11, the rack guide 12 is inserted into the rack housing 4 while the rack guide 12 being deformed. Therefore, the rack guide 12 is often made of a deformable synthetic resin.

When assembling the rack guide 12 to the rack housing 4, the width of the protrusion 13 needs to be formed smaller than the width of the recess 11 in the axial directions of the rack shaft 9 so that the protrusion 13 can be inserted into the recess 11. Therefore, if the elastic members 16 are not provided, gaps are produced between the protrusion 13 and the recess 11. This relation is similar in the conventional structure in terms of necessity of the assembly, and a gap is unavoidably produced between the engagement projection of the rack bush and the engagement groove of the housing as disclosed in JP-A No. 2007-131025. However, since the gap is produced often within the range of the designed tolerance in the conventional structure, it is significantly small. The existence of the gap results in individual specificity of steering feel of each steering device. Since the gap is produced within the range of the designed tolerance, it is difficult to accurately form members without producing the gap. Next, behaviors of the rack shaft 9, the rack guide 12, and the elastic members 16 are described.

Before a steering operation is inputted, the rack guide 12 is located in contact with the outer circumferential surface of the rack shaft 9, as described above. Further, as illustrated in FIGS. 2A and 2B, the protrusion 13 is held in a substantially central part of the recess 11 in the axial directions of the rack shaft 9 by the elastic forces of the two elastic members 16.

When the steering operation is performed, the steering wheel is turned first. When the steering wheel is turned, this rotation is transmitted by the steering column and the suitable coupling member to the pinion shaft 2 illustrated in FIG. 1. When the rotation is transmitted, the pinion shaft 2 rotates about the center axis thereof. When the pinion shaft 2 rotates, the pinion formed on the outer circumferential surface of the pinion shaft rotates. When the pinion rotates, the torque is transmitted to the rack that engages with the pinion. When the torque is transmitted to the rack, the rack shaft 9 where the rack is formed is pushed leftward or rightward of the vehicle body along the axis of the rack shaft 9. When the rack shaft 9 moves along the axis, the rack guide 12 that is in contact with the outer circumferential surface of the rack shaft 9 receives friction from the outer circumferential surface of the rack shaft 9. Thus, the rack guide 12 follows the motion of the rack shaft 9. In other words, the rack guide 12 is pulled by the rack shaft 9 with the frictional force to move in the same direction as the moving direction of the rack shaft 9 from the initial state illustrated in FIGS. 2A and 2B.

Here, behavior of a conventional rack guide is described. Similar to the conventional structure, if the elastic members 16 are not provided, and the protrusion 13 of the rack guide 12 is simply inserted and engaged in/with the recess 11 of the rack housing 4, one side surface or the other side surface of the protrusion 13 in the axial directions of the rack shaft 9 is in contact with the inner surface of the recess 11, even before the input of a steering operation. In other words, the gap always exists between the protrusion 13 and the recess 11 because of the necessity of assembly of the members as described above. Therefore, the protrusion 13 is in a state in which it is pressed against part of the inner surface of the recess 11 by a previous steering operation. Note that, in the conventional case, it is difficult to adjust the protrusion 13 into the state illustrated in FIG. 2B, i.e., finely adjust the position of the rack guide 12 without contacting the protrusion 13 to any portion of the recess 11. Therefore, the adjustment is not normally performed.

For example, in the conventional structure, it is supposed that the rack shaft 9 moves toward the opening side of the rack housing 4 (i.e., rightward in FIG. 2B) by the input of a steering operation, from the state in which the protrusion 13 is in contact with the inner surface of the recess 11 on the opening side of the rack housing 4. In this case, since the protrusion 13 is in contact with the inner surface of the recess 11 on the opening side of the rack housing 4, the rack guide 12 cannot move even if the rack shaft 9 tries to move. Thus, in order to move the rack shaft 9, stress exceeding the static friction force produced between the outer circumferential surface of the rack shaft 9 and the inner circumferential surface of the rack guide 12 is required. That is, the stress exceeding the static friction force is stress required for steering operation, and stress required for being inputted to the rack shaft 9 via the steering wheel, the pinion shaft, etc.

Figure 3:
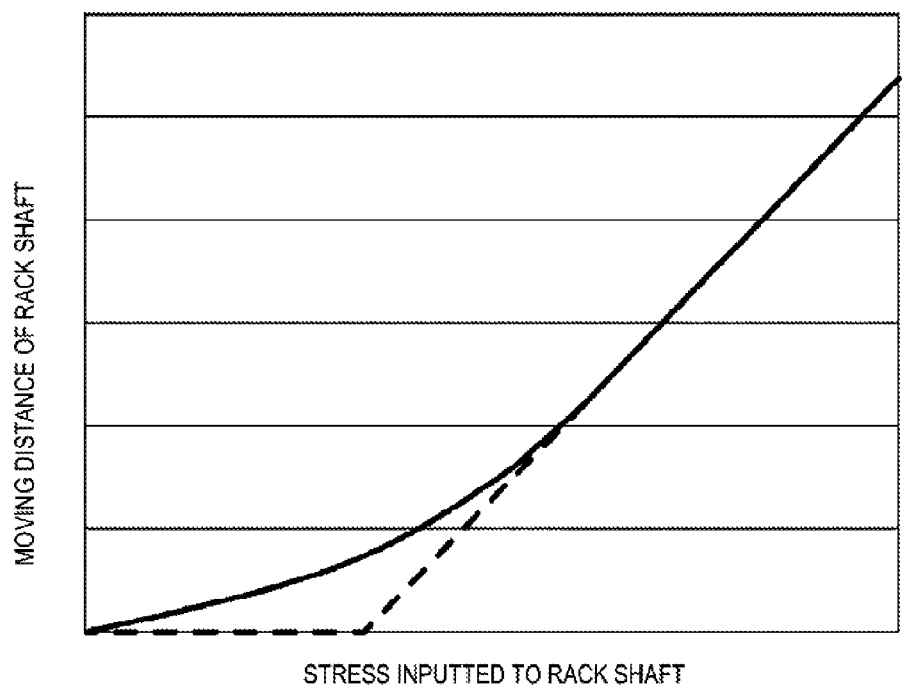
FIG. 3 is a graph illustrating a relation between stress inputted to a rack shaft at the time of a steering operation and a moving distance of the rack shaft.

FIG. 3 is a graph illustrating a relation between the stress inputted to the rack shaft 9 and a moving distance of the rack shaft 9. This relation is similar to the relation, for example, between the torque required for a steering operation and a rotation angle of the steering wheel. In the conventional structure, since the rack shaft 9 begins to move for the first time when there is an input of the stress exceeding the static friction force produced between the outer circumferential surface of the rack shaft 9 and the inner circumferential surface of the rack guide 12, the relation between the stress inputted to the rack shaft 9 and the moving distance of the rack shaft 9 becomes as a dashed line of the graph illustrated in FIG. 3. That is, even if a steering operation is inputted, the rack shaft 9 does not move until the inputted stress exceeds the static friction force described above. In other words, even if the steering wheel is tried to be rotated, the rack shaft 9 does not move, and the steering operation may not be reflected to the traveling direction of the vehicle. Further, when the stress exceeds the static friction force, the rack shaft 9 starts moving suddenly.

Note that actual time after starting the input of a steering operation until the stress inputted to the rack shaft 9 exceeds the static friction force is very short in many cases. Therefore, time during which a steering operation is not reflected is also short. Further, the distance by which the rack shaft 9 suddenly moves is small. As described above, slight uncomfortableness may be caused in the steering operation, although it does not reduce traveling safety as much as inducing, for example, a mistake in the steering operation. This leads to reducing smoothness of the steering operation.

Further, in the conventional structure, the behavior of the rack guide 12 often varies according to the type of a steering operation. Examples of the steering operation that cause a difference in the behavior of the rack guide 12 include a turning back and a turning of the steering wheel. In particular, one example of the turning back is a state in which the steering wheel is turned to the right and then turned back to the left. On the other hand, one example of the turning is a state in which the steering wheel is turned to the right and then additionally turned to the right.

It is assumed that, when performing the turning back, for example, when the steering wheel is first turned to the right, the protrusion 13 is in contact with the inner surface of the recess 11 on the opening side of the rack housing 4. This is a state in which, for example, the protrusion 13 came to contact the right inner surface of the recess 11 illustrated in FIG. 2B by first turning the steering wheel to the right. From this state, when the steering wheel is turned to the left, the rack shaft 9 moves leftward of FIG. 2B. When the rack shaft 9 moves, the rack guide 12 also moves leftward of FIG. 2B to follow the motion of the rack shaft 9. The rack guide 12 moves until the protrusion 13 contacts the inner surface of the recess 11 on the opposite side from the opening of the rack housing 4. Since the rack guide 12 does not move any more when the protrusion 13 contacts the recess 11, the static friction force is caused between the rack shaft 9 and the rack guide 12. If the input of a steering operation is further performed, since only the rack shaft 9 begins to move, a dynamic friction force is caused between the rack shaft 9 and the rack guide 12.

Therefore, at the time of turning back, the rack shaft 9 will be in the state in which it does not move if the static friction force is not exceeded while inputting the stress for moving the rack shaft 9. Thus, in the conventional structure, the steering feel may be changed in the middle of the turning back.

On the other hand, it is assumes that, when performing the turning, for example, when the steering wheel is first turned to the right, the protrusion 13 is in contact with the inner surface of the recess 11 on the opening side of the rack housing 4. This is a state in which, for example, the protrusion 13 came to contact the right inner surface of the recess 11 illustrated in FIG. 2B by first turning the steering wheel to the right. From this state, when the steering wheel is further turned to the right, the rack shaft 9 moves rightward of FIG. 2B. At this time, even if the rack guide 12 tries to move so as to follow the motion of the rack shaft 9, the rack guide 12 cannot move because the protrusion 13 is in contact with the recess 11. That is, the static friction force has been caused between the rack shaft 9 and the rack guide 12 after the turning is started. Since only the rack shaft 9 begins to move if the input of a steering operation is further performed exceeding the static friction force, the dynamic friction force is caused between the rack shaft 9 and the rack guide 12.

Therefore, at the time of turning, if the rack shaft 9 is tried to be moved, the rack shaft 9 does not move unless the static friction force is exceeded. Since the rack shaft 9 does not move during turning when the input of stress is started, a slight hooked feel is sensed when the input of a steering operation is started. Thus, in the conventional structure, the slight hooked feel may often be caused in the steering feel at the time of turning.

With the structure of the steering operation described above, the operation of turning the steering wheel, for example, to the right is common in the turning back and the turning. However, a difference is caused by the gap between the protrusion 13 and the recess 11, in the behavior of the rack guide 12 between the turning back and the turning when the rack shaft 9 moves. That is, the difference may be caused in the steering feel, by the difference in the behavior of the rack guide 12 even if the steering operation is performed from the same direction similar to the turning back and the turning.

As described above, although various troubles may be caused in the conventional case of not providing the elastic members, those troubles are not caused or are difficult to be caused in the steering device 1 according to one example of the present disclosure because the steering device 1 is provided with the elastic members 16.

In particular, first, when there is no input of a steering operation, the elastic members 16 can hold the position of the protrusion 13 within the recess 11 unchanged. In particular, as illustrated in FIG. 2B, the elastic members 16 hold the protrusion 13 at the substantially central part of the recess 11 in the axial directions of the rack shaft 9.

Further, since the protrusion 13 is maintained by the elastic members 16 in a state in which the protrusion 13 is not in contact with the inner surface of the recess 11, the rack guide 12 can also move to the left or the right so as to always follow the motion of the rack shaft 9 when there is an input of a steering operation. Thus, a relation close to the ideal relation between the stress inputted to the rack shaft 9 and the moving distance of the rack shaft 9 can be obtained like the graph illustrated by the solid line in FIG. 3.

That is, if there is no input of a steering operation, since the rack guide 12 is always pushed back to the position illustrated in FIG. 2B by the elastic force of the elastic member 16, the rack guide 12 can move together with the rack shaft 9 while compressing the elastic member 16 if the stress begins to be inputted into the rack shaft 9. Since the rack guide 12 does not move any more when the compression of the elastic member 16 reaches its limit, only the rack shaft 9 begins to move when the stress inputted into the rack shaft 9 exceeds the static friction force produced between the outer circumferential surface of the rack shaft 9 and the inner circumferential surface of the rack guide 12. Therefore, since the elastic members 16 are provided, the state in which the steering operation is not reflected in the traveling direction of the vehicle, where the rack shaft 9 does not move even if the steering wheel is tried to be turned, is not caused or is difficult to be caused. In addition, by providing the elastic members 16, since it is necessary to continue inputting a certain amount of stress into the steering wheel in order to begin to move the rack shaft 9 together with the rack guide 12, stress exceeding the static friction force is not necessary from the beginning, and the change in the stress inputted into the steering wheel transits smoothly compared with the conventional structure. Therefore, the rack shaft 9 does not move suddenly or is difficult to move suddenly. Thus, the smooth steering operation is not disturbed in the steering device 1.

Further, when the rack guide 12 moves so as to follow the motion of the rack shaft 9, and even if the steering operation is stopped to suspend the rack shaft 9 at the position after the rack shaft 9 moved, the rack guide 12 easily returns to its initial position by the elastic force of the elastic member 16. Thus, since the rack guide 12 returns to the initial position promptly and correctly even if the turning or the turning back is carried out in steering operation. Therefore, the steering feel is kept constant. Accordingly, the steering device 1 provided with the elastic members 16 does not cause or is difficult to cause the difference in the steering feel between the turning and the turning back of a steering operation.

The sizes of the recess 11 and the protrusion 13 in the axial directions of the rack shaft 9, and the cross section diameter, the modulus of elasticity, etc. of the elastic members 16 are not limited as long as each member is assemblable, the protrusion 13 is holdable at the initial position in the state in which there is no input of a steering operation, and the protrusion 13 can be returned to the initial position promptly and correctly even when there is an input of a steering operation. For example, those parameters may be particularly selected according to the frictional force acting between the rack shaft 9 and the rack guide 12, the moving speed of the rack shaft 9, vibration and impacts acting to the steering device 1 during traveling, etc. In particular, the cross section diameter and the modulus of elasticity of the elastic members 16 may be selected so that the stress inputted to the rack shaft 9 while compressing the elastic member 16 causes the smooth transition from the static friction force to the dynamic friction force, and is enough to easily return the rack guide 12 back to the initial position even if the rack guide 12 moves.

Figure 4A:
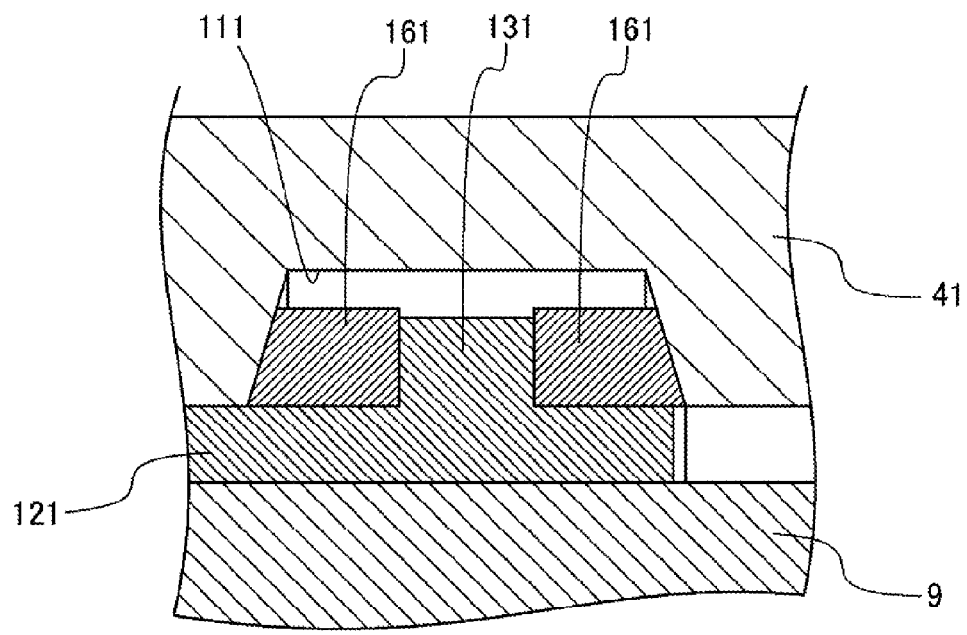
FIGS. 4A and 4B are partially enlarged cross-sectional view illustrating modifications of a buffer member of the present disclosure.
Figure 4B:
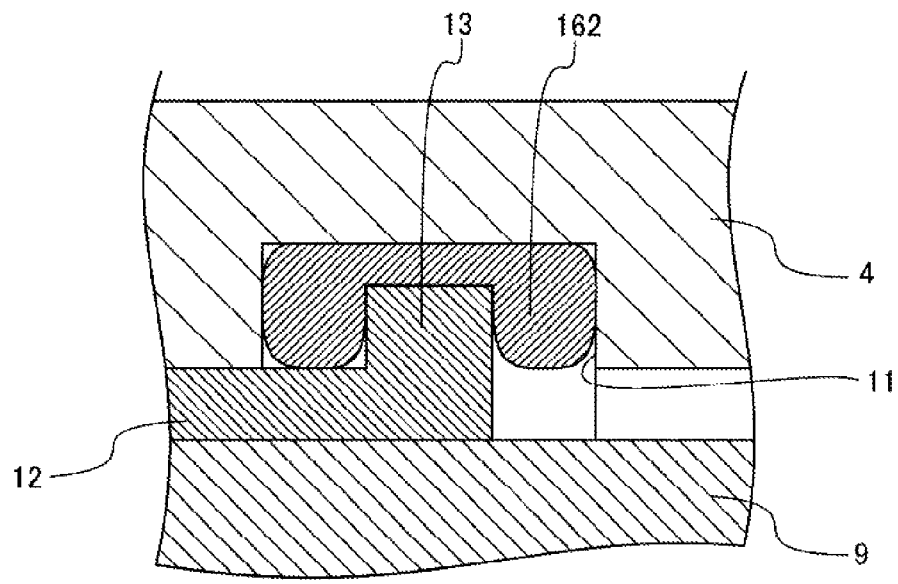

FIGS. 4A and 4B illustrate modifications of the elastic member in the present disclosure, where the elastic member and its vicinity are particularly enlarged. Note that, since the rack shaft illustrated in FIGS. 4A and 4B used the same member as the rack shaft 9 illustrated in FIGS. 2A and 2B, the same reference numeral is assigned and the detailed description thereof is omitted. Although not illustrated in FIGS. 4A and 4B, the left side in FIGS. 4A and 4B is the one end opening side of the rack housing.

In the modification illustrated in FIG. 4A, a protrusion 131 of a rack guide 121 is inserted and disposed in a recess 111 of a rack housing 41, and elastic members 161 respectively contact the one side surface and the other side surface of the protrusion 131 in the axial directions of the rack shaft 9. The recess 111 is formed such that the width of the rack shaft 9 in the axial directions becomes narrower outwardly in the radial directions of the rack shaft 9, i.e., upwardly in FIG. 4A. Since the recess 111 has such a shape, assembly is much easier than the example illustrated, for example in FIGS. 2A and 2B. Note that the protrusion 131 of the rack guide 121 does not protrude outside from the edge like the protrusion 13 of the rack guide 12, but is formed so as to protrude from part of an outer circumferential surface of the rack guide 121. This is for preventing the elastic member 161 from falling off from the recess 111, because, when the rack guide 121 moves so as to follow the motion of the rack shaft 9, the elastic member 161 is compressed, and the elastic member 161 is pushed out by the protrusion 131 radially inward of the rack shaft 9, depending on the shape of the recess 111.

In another modification illustrated in FIG. 4B, the protrusion 13 of the rack guide 12 is inserted and disposed in the recess 11 of the rack housing 4, and one elastic member 162 contacts one side surface and the other side surface of the protrusion 13 in the axial directions of the rack shaft 9. The elastic member 162 is a block-shaped, plate-shaped, or annular-shaped member disposed in the recess 11. When assembling, the rack guide 12 is disposed so that a substantially central part of the elastic member 162 (which is placed inside the recess 11 in advance) in the axial directions of the rack shaft 9 is squashed by the protrusion 13 in the axial directions of the rack shaft 9. Thus, the elastic member 162 contacts to the one side surface and the other side surface of the protrusion 13 in the axial directions of the rack shaft 9, similar to the elastic members 16 and 161 illustrated in FIGS. 2 and 4A. Note that, since the elastic member 162 is pressed by the protrusion 13 outwardly in the radial direction of the rack shaft 9, it is difficult to fall off from the recess 11. Thus, the elastic member 162 does not have to be provided entirely in the circumferential direction of the rack guide 12, as long as the protrusion 13 is secured. For example, similar elastic members may be provided at four locations, equally separated by 90 degrees in the circumferential direction.

By providing the elastic member 161 or 162, the position of the protrusion 131 or 13 inside the recess 111 of 11 is kept at the same position when there is no input of a steering operation. In particular, as illustrated in FIGS. 4A and 4B, the protrusion 131 or 13 is held by the elastic member 161 or 162 at the substantially central part of the recess 111 or 11 in the axial directions of the rack shaft 9.

In addition, since the protrusion 131 or 13 is maintained by the elastic member 161 or 162 in the state in which the protrusion 131 or 13 is not in contact with the inner surface of the recess 111 or 11, the rack guide 121 or 12 can move to either left or right so as to always follow the motion of the rack shaft 9 when there is an input of a steering operation. Thus, a relation close to the ideal relation between the stress inputted to the rack shaft 9 and the moving distance of the rack shaft 9 can be obtained like the graph illustrated by the solid line in FIG. 3. Therefore, the smooth steering operation is not disturbed in the modifications illustrated in FIGS. 4A and 4B.

In addition, when the rack guide 121 or 12 moves so as to follow the motion of the rack shaft 9, even if the steering operation is stopped to suspend the rack shaft 9 at the position after the rack shaft 9 moved, the rack guide 121 or 12 easily returns to the initial position by the elastic force of elastic member 161 or 162. Thus, since the rack guide 121 or 12 returns to the initial position promptly and correctly even if the turning or the turning back is carried out in steering operation. Therefore, the steering feel is kept constant. Accordingly, the modifications illustrated in FIGS. 4A and 4B do not cause or are difficult to cause the difference in the steering feel between the turning and the turning back of a steering operation.

Although the example to which the invention made by the present inventor is applied is described above, the present disclosure is not intended to be limited by the description and the drawings of the example which constitutes part of the present disclosure. That is, it is additionally noted that all of other examples, instances, operation techniques, etc. that may be implemented by the person skilled in the art based on the example encompass the scope of the claims in the present disclosure.

Further, in the foregoing specification, specific examples of the present disclosure have been described. However, one of ordinary skill in the technique appreciates that various modifications and changes can be performed without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A steering device comprising:
   a pinion shaft that has a pinion on an outer circumferential surface thereof;
   a rack shaft that has a rack that engages with the pinion;
   a rack housing that has a recess on an inner circumferential surface thereof and accommodates the rack shaft;
   a rack guide that has a protrusion formed smaller than a width of the recess in axial directions of the rack shaft, and is disposed inside the recess, the rack guide contacting an outer circumferential surface of the rack shaft and an inner circumferential surface of the rack housing, and guiding the rack shaft along an axis of the rack shaft; and
   a spacer that contacts one side and another side of the protrusion in the axial directions of the rack shaft, that contains a central part pressed by the protrusion outwardly in a radial direction of the rack shaft, and is disposed between an inner surface of the recess and an outer surface of the protrusion.

2. The steering device of claim 1, wherein
   at least one slot is circumferentially formed on the outer circumferential surface of the rack guide, and
   an annular contacting member is attached to the at least one slot, the annular contacting member contacting with the inner circumferential surface of the rack housing.

3. The steering device of claim 1, wherein the spacer contacts the outer surface of the protrusion in the radial direction of the rack shaft.

4. The steering device of claim 1, wherein the recess is formed so that the width thereof in the axial directions of the rack shaft is smaller toward an outside in radial directions of the rack shaft.

5. The steering device of claim 4, wherein
   at least one slot is circumferentially formed on the outer circumferential surface of the rack guide, and
   an annular contacting member is attached to the at least one slot, the annular contacting member contacting with the inner circumferential surface of the rack housing.

6. The steering device of claim 1, wherein the spacer is an elastic member having elasticity.

7. The steering device of claim 6, wherein
   at least one slot is circumferentially formed on the outer circumferential surface of the rack guide, and
   an annular contacting member is attached to the at least one slot, the annular contacting member contacting with the inner circumferential surface of the rack housing.

8. The steering device of claim 6, wherein the recess is formed so that the width thereof in the axial directions of the rack shaft is smaller toward an outside in radial directions of the rack shaft.

9. The steering device of claim 8, wherein
   at least one slot is circumferentially formed on the outer circumferential surface of the rack guide, and an annular contacting member is attached to the at least one slot, the annular contacting member contacting with the inner circumferential surface of the rack housing.

* * * * *